(12) United States Patent
Lee et al.

(10) Patent No.: US 8,078,061 B2
(45) Date of Patent: Dec. 13, 2011

(54) WAVELENGTH DIVISION MULTIPLEXED-PASSIVE OPTICAL NETWORK CAPABLE OF HIGH-SPEED TRANSMISSION OF AN OPTICAL SIGNAL BY USING MODULATION FORMAT HAVING HIGH SPECTRAL EFFICIENCY

(75) Inventors: Chang-Hee Lee, Daejeon (KR); Ki-Man Choi, Daegu (KR); Sil-Gu Mun, Daegu (KR); Jung-Hyung Moon, Pusan (KR)

(73) Assignee: Korea Advanced Institute of Science and Technology (KR)

( * ) Notice: Subject to any disclaimer, the term of this patent is extended or adjusted under 35 U.S.C. 154(b) by 700 days.

(21) Appl. No.: 12/064,229

(22) PCT Filed: Nov. 14, 2006

(86) PCT No.: PCT/KR2006/004766
§ 371 (c)(1),
(2), (4) Date: Feb. 19, 2008

(87) PCT Pub. No.: WO2007/136153
PCT Pub. Date: Nov. 29, 2007

(65) Prior Publication Data
US 2008/0232807 A1    Sep. 25, 2008

(30) Foreign Application Priority Data

May 19, 2006  (KR) .................. 10-2006-0045272

(51) Int. Cl.
*H04J 14/00* (2006.01)
*H04J 14/02* (2006.01)
*G02B 6/36* (2006.01)

(52) U.S. Cl. ........ 398/163; 398/201; 398/135; 398/136; 398/137; 398/138; 398/139

(58) Field of Classification Search ........... 398/135–139
See application file for complete search history.

(56) References Cited

U.S. PATENT DOCUMENTS 4,703,471 A * 10/1987 Fitelson et al. ............ 398/43
5,572,347 A * 11/1996 Burton et al. .............. 398/71
6,519,255 B1 * 2/2003 Graves ...................... 370/392

(Continued)

FOREIGN PATENT DOCUMENTS

CN    200410036891    4/2004

(Continued)

OTHER PUBLICATIONS

Park et al. "Fiber-to-the-Home Services Based on Wavelength-Division-Multiplexing Passive Optical Network", Journal of Lightwave Technology, vol. 22, No. 11, Nov. 2004 pp. 2582-2591.*

(Continued)

*Primary Examiner* — Danny Leung
(74) *Attorney, Agent, or Firm* — The Belles Group, P.C.

(57) ABSTRACT

The present invention discloses a wavelength-division multiplexing passive optical network (WDM-PON) capable of high-bandwidth transmission for optical signals by using modulation format having high spectral efficiency. The WDM-PON according to the present invention provides a larger capacity and higher bandwidth transmission economically (at lower costs) by using a modulation format where spectral efficiency (a transmission bit number per a unit band width) is high, while using a low noise part of a light source.

13 Claims, 4 Drawing Sheets

U.S. PATENT DOCUMENTS

| | | | |
|---|---|---|---|
| 7,073,956 B1* | 7/2006 | Shin et al. | 385/89 |
| 7,146,103 B2* | 12/2006 | Yee et al. | 398/68 |
| 7,155,134 B2* | 12/2006 | Azadet | 398/202 |
| 7,224,519 B2* | 5/2007 | Shin et al. | 359/344 |
| 7,277,639 B2* | 10/2007 | Kim et al. | 398/83 |
| 7,298,976 B2* | 11/2007 | Kim et al. | 398/84 |
| 7,327,957 B2* | 2/2008 | Lee et al. | 398/82 |
| 7,349,631 B2* | 3/2008 | Lee et al. | 398/82 |
| 7,515,620 B2* | 4/2009 | Gustavson et al. | 372/38.07 |
| 7,574,135 B2* | 8/2009 | Agazzi | 398/76 |
| 7,580,637 B2* | 8/2009 | El-Ahmadi et al. | 398/135 |
| 7,936,994 B2* | 5/2011 | Lee et al. | 398/90 |
| 2001/0004290 A1* | 6/2001 | Lee et al. | 359/124 |
| 2003/0180055 A1* | 9/2003 | Azadet | 398/183 |
| 2004/0151507 A1* | 8/2004 | Agazzi | 398/141 |
| 2005/0019036 A1* | 1/2005 | Soto et al. | 398/135 |
| 2005/0036787 A1* | 2/2005 | Lee et al. | 398/72 |
| 2005/0047727 A1* | 3/2005 | Shin et al. | 385/88 |
| 2005/0138670 A1* | 6/2005 | Ploumen | 725/118 |
| 2006/0088068 A1* | 4/2006 | Farrell et al. | 372/29.02 |
| 2006/0093359 A1* | 5/2006 | Lee et al. | 398/70 |
| 2006/0093360 A1* | 5/2006 | Kim et al. | 398/71 |
| 2006/0153566 A1* | 7/2006 | Sorin et al. | 398/72 |
| 2008/0050074 A1* | 2/2008 | Dallesasse et al. | 385/92 |
| 2008/0187314 A1* | 8/2008 | Chung et al. | 398/72 |
| 2008/0232807 A1* | 9/2008 | Lee et al. | 398/87 |
| 2009/0047025 A1* | 2/2009 | Hong et al. | 398/135 |
| 2009/0080880 A1* | 3/2009 | Lee et al. | 398/14 |
| 2009/0092390 A1* | 4/2009 | Lee et al. | 398/72 |
| 2009/0196612 A1* | 8/2009 | Lee et al. | 398/72 |

FOREIGN PATENT DOCUMENTS

| | | |
|---|---|---|
| JP | 1999127112 | 5/1999 |
| JP | 2004327988 | 11/2004 |
| JP | 2005033802 | 2/2005 |
| JP | 2005080310 | 3/2005 |
| WO | 2006052075 | 5/2006 |
| WO | WO2006052075 | 5/2006 |

OTHER PUBLICATIONS

Shin et al. "Low-cost WDM-PON with colorless bidirectional transceivers", Journal of Lightwave Technology, vol. 24, No. 1, Jan. 2006, pp. 158-165.*

"Noise Characteristics of Signal Reflected from ASE-Injected FP-LD in Loopback Access Networks," Electronics Letters, M. Fujiwara, vol. 42, No. 2, Jan. 2006.

Kim, Kang, Lee, "A Low-Cost WDM Source with an ASE Injected Fabry-Perot Semiconductor Laser," IEEE Photonics Technology Letters, Aug. 2000, pp. 1067-1069, vol. 12 No. 8, IEEE.

Choi, Baik, Lee, "Broad-band Light Source Using Mutually Injected Fabry-Perot Laser Diodes for WDM-PON," IEEE Photonics Technology Letters, Dec. 2005, pp. 2529-2531 vol. 17 No. 12, IEEE.

Xu Suyan et al, "Modern Optical Fiber Communication System." Sep. 30, 2005, pp. 89-90 and 105-106, China.

* cited by examiner

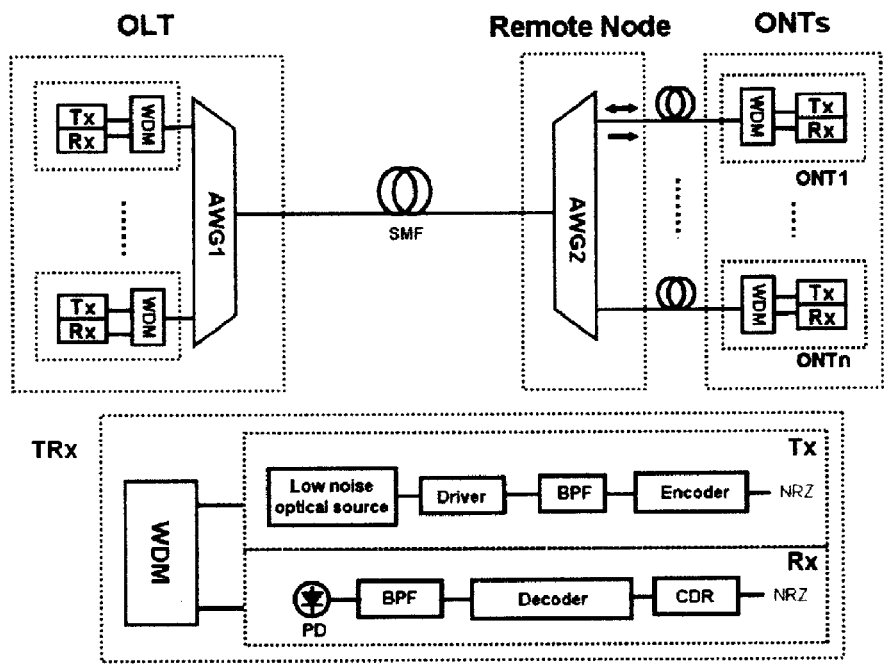
[Fig. 1]
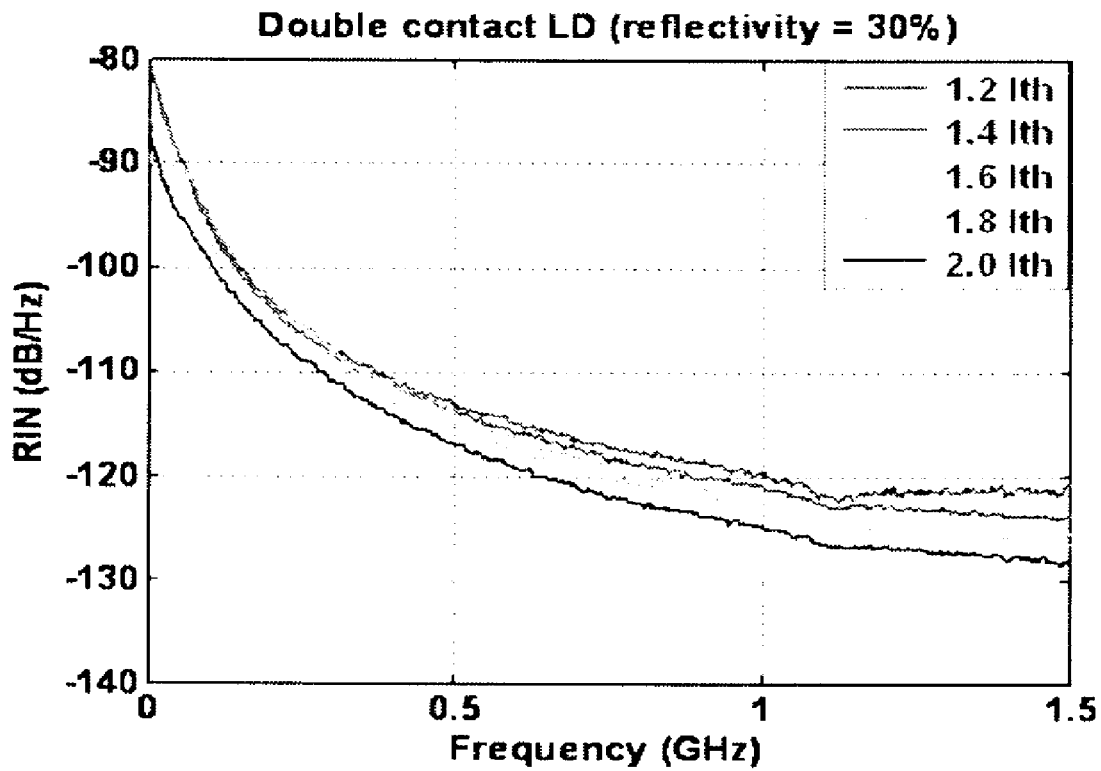
[Fig. 2]

[Fig. 3]
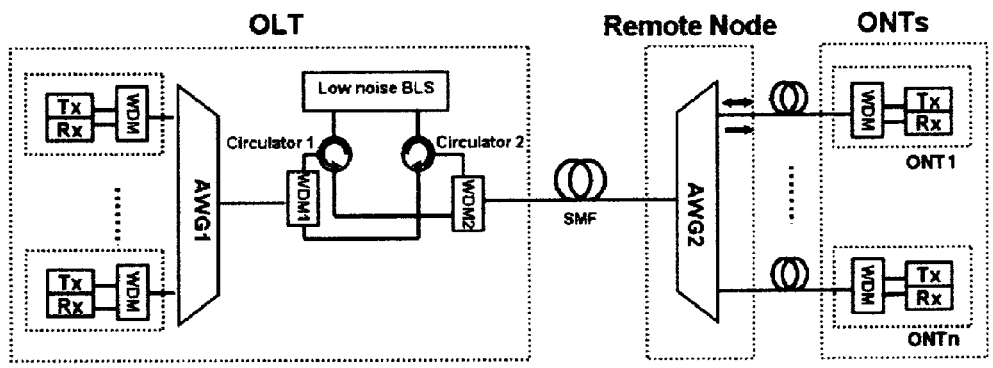
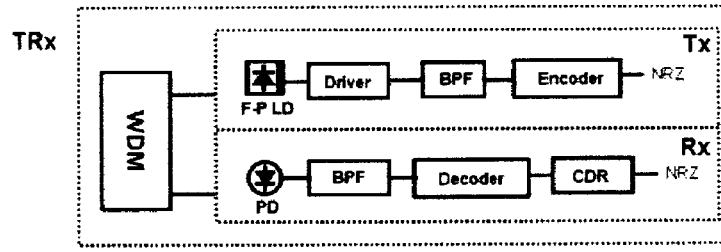
[Fig. 4]
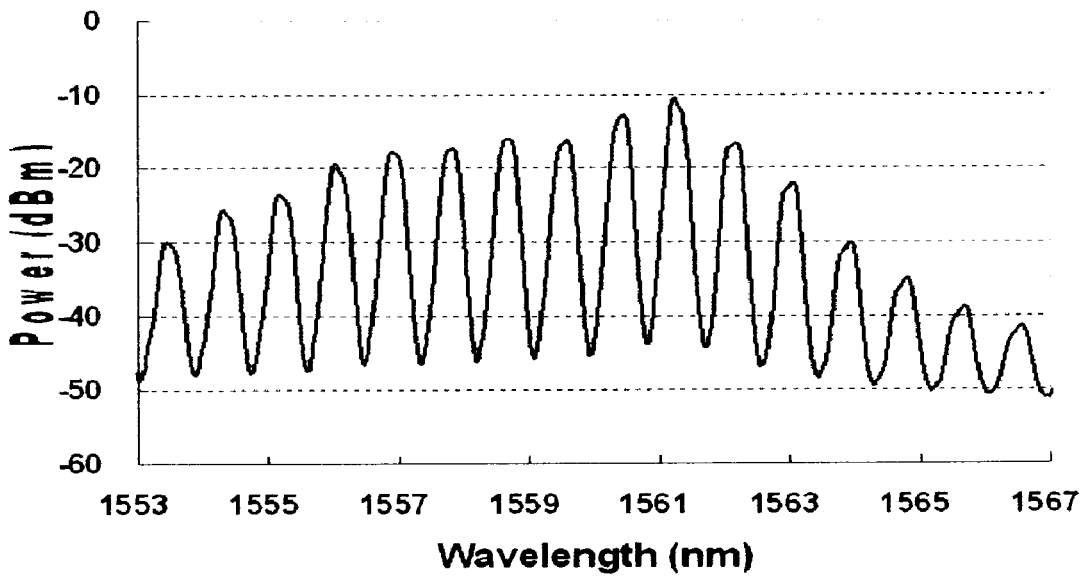

[Fig. 5]
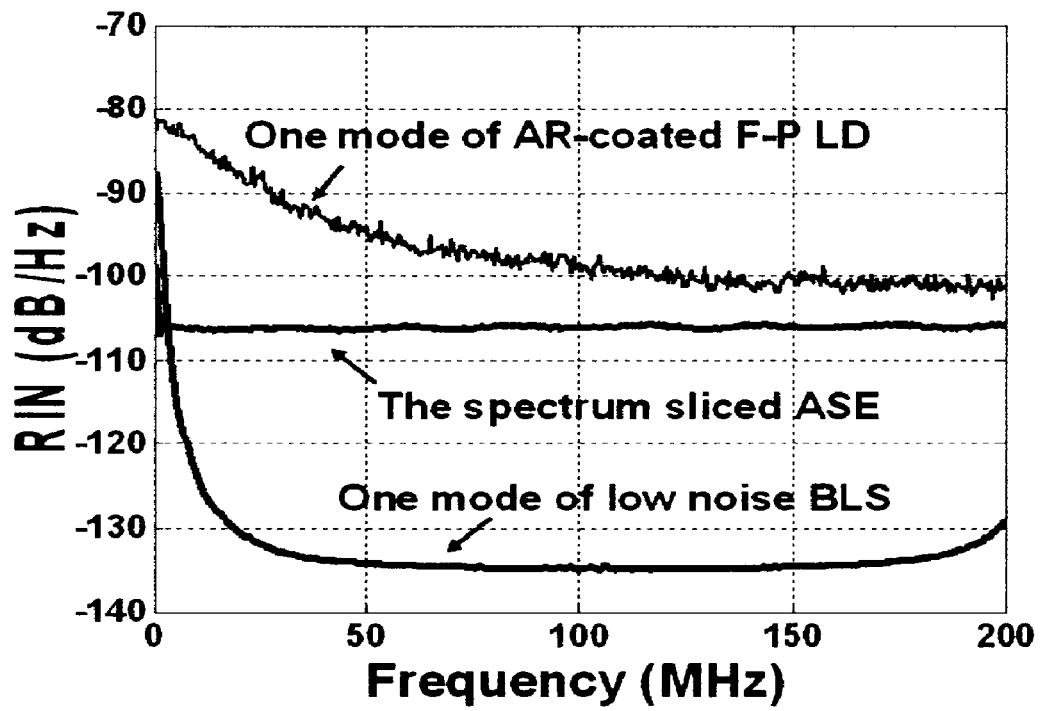
[Fig. 6]
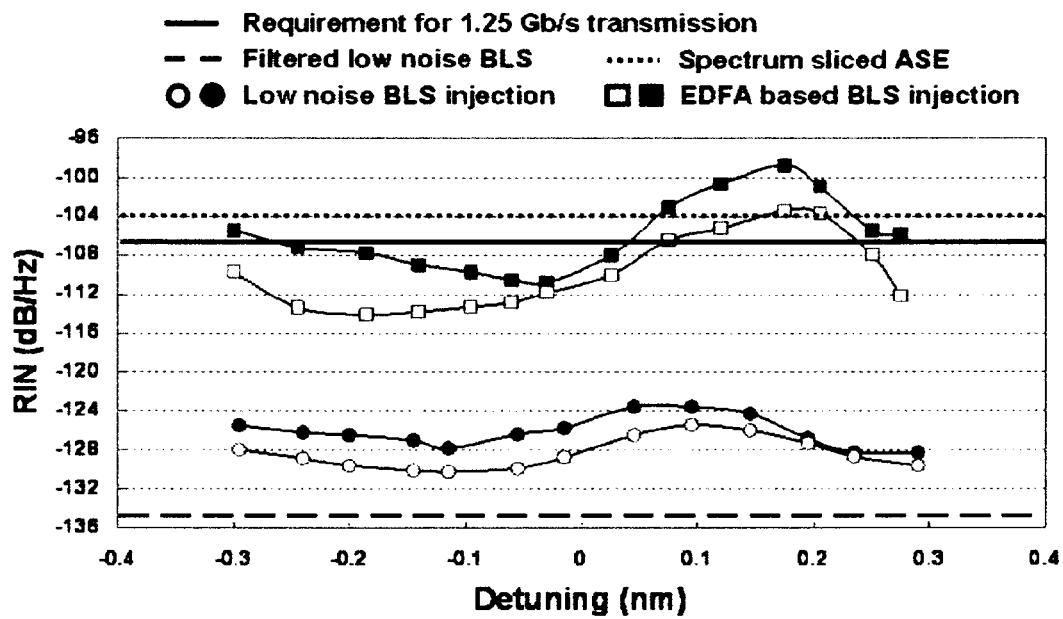

[Fig. 7]
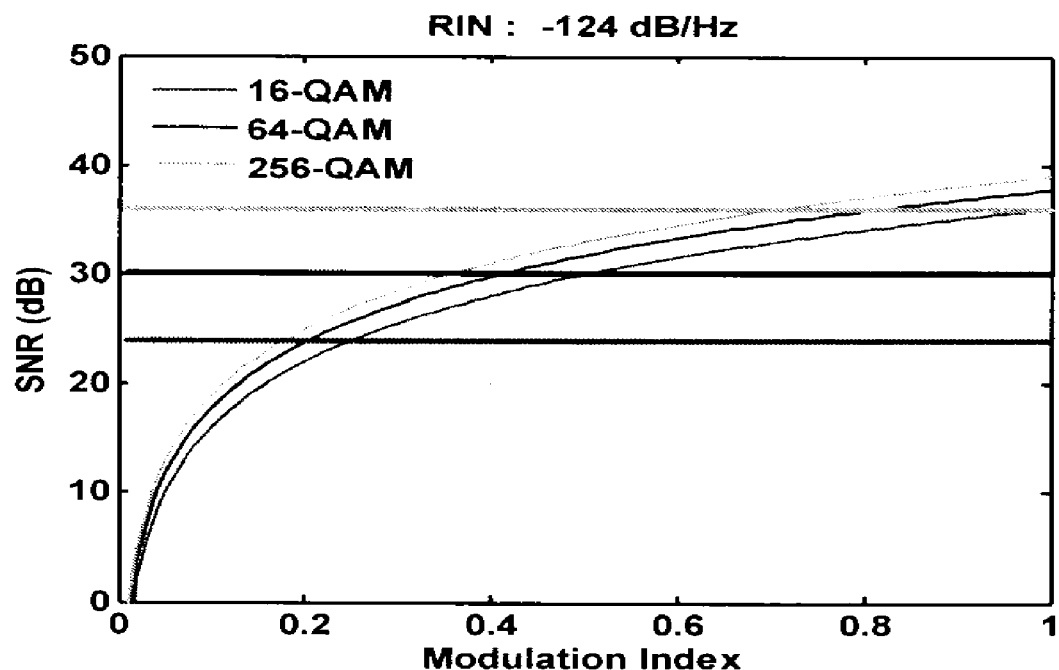
[Fig. 8]
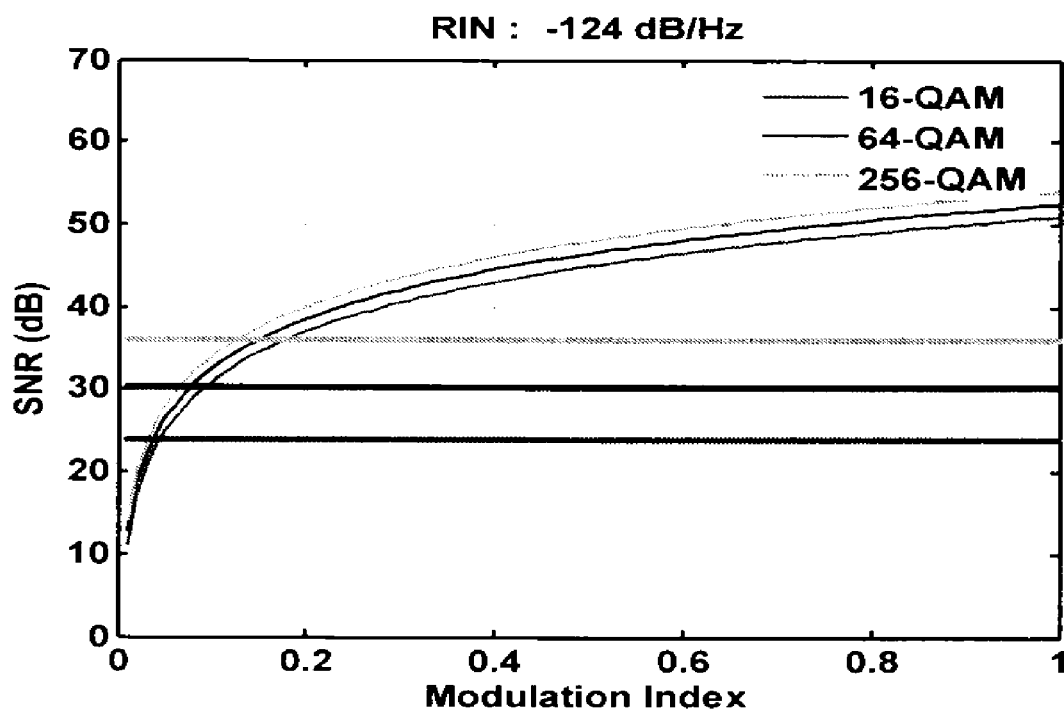

WAVELENGTH DIVISION MULTIPLEXED-PASSIVE OPTICAL NETWORK CAPABLE OF HIGH-SPEED TRANSMISSION OF AN OPTICAL SIGNAL BY USING MODULATION FORMAT HAVING HIGH SPECTRAL EFFICIENCY

CROSS-REFERENCE TO RELATED PATENT APPLICATIONS

The present application is a U.S. National Stage filing of Patent Cooperation Treaty ("PCT") application serial number PCT/KR2006/004766, filed Nov. 14, 2006, which in turn claims priority to Korean Patent Application No. 10-2006-0045272, filed May 19, 2006, all of which are hereby incorporated by reference herein in their entireties. PCT/KR2006/004766 was published in English under PCT Article 21(2) as WO/2007/136153 on Nov. 29, 2007.

TECHNICAL FIELD

The present invention relates to a wavelength division multiplexed-passive optical network (WDM-PON) capable of high-bandwidth transmission of an optical signal by using modulation format having high spectral efficiency. More specifically, the present invention relates to a WDM-PON capable of providing a larger capacity and higher bandwidth transmission economically (at lower costs) by using a modulation format where spectral efficiency (a number of the transmission bit per a unit band width) is high, while using a lower noise part in noise characteristics of a light source.

BACKGROUND ART

The existing networks provide an access to internet mostly by ADSL and VDSL which employs a telephone line or a cable modem which employs a coaxial cable, or the like. Either the telephone line or the coaxial cable described above is comprised of copper wires so that a bandwidth thereof to be provided with subscribers has a maximum limit of approximately 10 Mb/s, although it may vary depending on a transmission distance. However, demand on a high-bandwidth service is rapidly increased as voice and text oriented services have evolved to video oriented services due to a rapid expansion of internet. As a method of meeting the demand on a high-bandwidth, an evolution of respective networks, which have been deployed by a company or companies running telecommunications businesses or cable TV businesses, is required for providing services where video, data and voice are integrated. In order to accommodate next-generation services including a high definition TV (HDTV)/an Internet Protocol TV (IP-TV), a video on demand (VOD), an education on demand (EOD), etc., which require a high bandwidth, a WDM-PON capable of providing the subscribers with a bandwidth of 100 Mb/s or more, while guaranteeing a high quality of service ($Q_oS$) is considered to be an ultimate alternative. Further, it is anticipated that a bandwidth for future optical networks will be increased gradually.

Generally, an arrayed wavelength grating (AWG) is widely used as a wavelength division multiplexing filter in a WDM-PON. However, since a wavelength to be assigned each subscriber and a transmission wavelength of an AWG may be changed when an ambient temperature is changed, a low-cost light source having a wavelength-independent operation, i.e., a color-free operation is necessarily required to be used as a light source independent of a wavelength assigned to each subscriber, in order to control and manage wavelength easily depending on a temperature change. As an example of a light source having a wavelength-independence characteristic described above, Hyun-Deok, Kim, et al. suggested a wavelength-locked Fabry-Perot laser diode (F-P LD) in an article entitled "A low-cost WDM source with an ASE injected Fabry-Perot semiconductor laser" published in August 2000 at *IEEE Photon, Technol. Lett.*, vol. 12, no. 8, pp. 1067-1069. The wavelength-locked F-P LD suggested by Hyun-Deok, Kim, et al. is a method where a broadband light source (BLS) is injected into an F-P LD which oscillates in multiple modes so that the oscillated wavelength of the F-P LD is locked into the wavelength of the BLS. In this case, a high-power light emitting diode (LED), an erbium-doped fiber amplifier (EDFA) which emits amplified spontaneous emission (ASE), a super luminescent diode (SLD), etc., may be used as a BLS to be injected into a wavelength-locked F-P LD.

In the meanwhile, a light source to be used in an optical communications should have a low relative intensity noise (RIN) for maintaining a good quality of transmission. For example, an F-P LD which oscillates in multiple modes is not appropriate to be used as a light source for a WDM system or a WDM-PON, because transmission of an optical signal becomes difficult due to a high RIN thereof. More specifically, in case that one mode among multiple modes in an F-P LD is selected, a high mode partition noise occurs so that an F-P LD which oscillates in multiple modes is impossible to be used as a light source for WDM optical communications. As one method for reducing a RIN, a method for reducing a mode partition noise significantly by oscillating an F-P LD in a pseudo-single mode by injecting a BLS into the F-P LD (a wavelength-locked F-P LD) and a WDM-PON using the same have been suggested. However, even a WDM-PON using a wavelength-locked F-P LD bears a problem when accommodating lots of channels in one PON by narrowing a channel spacing or increasing a data rate as will be described below.

In a BLS which is injected into an F-P LD to embody a wavelength-locked F-P LD, a bandwidth of the BLS to be injected is determined by a bandwidth of an AWG being used. Thus, a BLS should have a high level of noise because it experiences a pre-filtering process when it is injected. Generally, as a data rate to be provided for each subscriber is higher, a light source to be used should have a better noise characteristic. However, there is a problem that a RIN of a BLS to be injected becomes poorer, as a bandwidth of a BLS or a channel spacing becomes narrower. This problem functions a factor barring a WDM-PON from accomplishing a larger capacity and a higher bandwidth thereof.

FIG. 6 illustrates a noise degradation characteristic measured before and after being filtered by an AWG of a wavelength-locked F-P LD in accordance with the present invention. Referring to FIG. 6, the RIN of a wavelength-locked F-P LD by injecting an ASE-based BLS which is filtered by using an AWG having a channel spacing of 50 GHz is measured at injection positions (detuning) of a BLS based on a lasing wavelength of an F-P LD as a standard, and is illustrated as rectangles. Here, the RIN of a total mode of the wavelength-locked F-P LD is illustrated as white rectangles, while the RIN of the light source which arrived at a receiving end after passing through AWGs for multiplexing and de-multiplexing is illustrated as black rectangles. As can be seen from FIG. 6, in case that a center wavelength of the BLS being injected conforms to a lasing wavelength of the F-P LD (0 nm detuning), a mode partition noise of the F-P LD is more effectively suppressed than a noise of the BLS being injected depending on an injection effect of the BLS, from a comparison of the RIN values between a spectrum sliced ASE and black rectangles. However, in case that a center wavelength of the BLS being injected lies between two lasing modes of the F-P LD (+/−0.3 nm detuning), a suppression effect of a mode partition noise of the F-P LD cannot be obtained and the noise of the wavelength-locked F-P LD is rather more increased than the RIN (−104 dB/Hz) of the injected BLS. Further, the RIN of depending on a temperature change of the wavelength-locked F-P LD may experience a worse noise degradation when passing through AWGs for multiplexing and de-multiplexing. As illustrated in FIG. 6, in case of using a wavelength-locked F-P LD by injection of an ASE-based BLS, the RIN (black rectangles) of a light source arriving at an receiving end, which is measured after passing through AWGs for multiplexing and de-multiplexing, does not always satisfy, with regard to 1.25 Gb/s data signal, the RIN value less than −107 dB/Hz which is a requirement for transmitting in a modulation format of an On Off Keying (OOK) modulation method, while satisfying a bit error rate (BER) of $10^{-12}$ (Q=7). This problem acts as an obstacle factor against a higher bandwidth and a larger capacity and appears commonly in both cases of using a wavelength-locked F-P LD as a light source for a WDM-PON and of using a reflective semiconductor optical amplifier (RSOA) having wavelength injection method.

DISCLOSURE OF INVENTION

Technical Problem

The object of the present invention is to solve the prior art problems and provide a WDM-PON capable of providing a larger capacity and higher bandwidth transmission economically (at lower costs) by using a modulation format where spectral efficiency (a transmission bit number per a unit bandwidth) is high, while using a lower noise part in noise characteristics of a light source. More specifically, the present invention is to embody a light source having a lower noise characteristic compared with a wavelength-locked F-P LD by injection of an ASE-based BLS in order to solve the prior art problems and provide a WDM-PON by using a modulation format having high spectral efficiency.

Technical Solution

According to first aspect of the present invention, the present invention provides a wavelength-division multiplexing passive optical network (WDM-PON) capable of high-bandwidth transmission for optical signals comprising: a first arrayed waveguide grating (AWG) being positioned at an optical line termination (OLT) and having n-numbered output ports; n-numbered optical transceivers (TRx) (OLT1 to OLTn) respectively connected to the first AWG; a second AWG being positioned at a remote node (RN) and having n-numbered output ports; n-numbered optical transceivers (TRx) (ONT1 to ONTn) being positioned at subscribers (ONT) and respectively connected to the second AWG; a single mode fiber (SMF) being used for transmission of signals transmitted through the first AWG and the second AWG; and n-numbered SMFs for separate transmission being connected between the second AWG and the n-numbered optical transceivers (TRx) (ONT1 to ONTn), wherein each of the n-numbered optical transceivers (TRx) (OLT1 to OLTn) at the OLT and each of the n-numbered optical transceivers (TRx) (ONT1 to ONTn) at the subscribers (ONT) comprises: a WDM filter into which an optical signal, split through the first AWG and the second AWG, is inputted; an optical transmitter (Tx) being connected to the WDM filter and for transmitting optical signals having different wavelength bands; and an optical receiver (Rx) being connected to the WDM filter and for receiving the optical signals having different wavelength bands, wherein the optical transmitter (Tx) comprises: a low noise optical light source having a low noise characteristic at a specific frequency range; a driver for modulating the low noise light source at the specific frequency range; and an encoder being connected to the driver and for transforming data to be transmitted into a modulation format having high spectral efficiency, and wherein the optical receiver (Rx) comprises: a photo diode (PD) for transforming a transmitted optical signal into an electrical signal; a first band pass filter (BPF) for passing only a spectrum range which corresponds to a component of the transmitted signal; and a decoder for transforming the modulation format passed the first BPF into original data.

In the first aspect of the present invention, the low noise optical light source having a low noise characteristic at a specific frequency range which is used in a WDM-PON may use an operation method for making the low noise optical light source to have a low RIN value by changing driving current. Further, an F-P LD having a multiple-contact which is easy for controlling a wavelength may be used instead of an F-P LD as the low noise optical light source having a low noise characteristic at a specific frequency range.

According to second aspect of the present invention, the present invention provides a wavelength-division multiplexing passive optical network capable of high-bandwidth transmission for optical signals comprising: a low noise broadband light source (BLS) which is oscillating in a plurality of lasing modes; a first circulator and a second circulator respectively being connected to the low noise BLS; a first arrayed waveguide grating (AWG) being positioned at an optical line termination (OLT) and having n-numbered output ports; n-numbered optical transceivers (TRx) (OLT1 to OLTn) respectively connected to the first AWG; a second AWG being positioned at a remote node (RN) and having n-numbered output ports; a single mode fiber (SMF) being used for transmission of signals transmitted through the first AWG and the second AWG; a first wavelength division multiplexing (WDM) filter being connected to the first circulator, the second circulator, and the first AWG, respectively; a second WDM filter being connected to the first circulator, the second circulator, and the SMF, respectively; n-numbered optical transceivers (TRx) (ONT1 to ONTn) being positioned at subscribers (ONT) and respectively connected to the second AWG; and n-numbered SMFs for separate transmission being connected between the second AWG and the n-numbered optical transceivers (TRx) (ONT1 to ONTn), wherein each of the n-numbered optical transceivers (TRx) (OLT1 to OLTn) at the OLT and each of the n-numbered optical transceivers (TRx) (ONT1 to ONTn) at the subscribers (ONT) comprises: a WDM filter into which an optical signal, split through the first AWG and the second AWG, is inputted; an optical transmitter (Tx) being connected to the WDM filter and for transmitting optical signals having different wavelength bands; and an optical receiver (Rx) being connected to the WDM filter and for receiving the optical signals having different wavelength bands, wherein the optical transmitter (Tx) comprises: a wavelength-locked F-P LD by injecting the low noise BLS; a driver for modulating the wavelength-locked F-P LD; and an encoder being connected to the driver and for transforming data to be transmitted into a modulation format having high spectral efficiency, and wherein the optical receiver (Rx) comprises: a photo diode (PD) for transforming a transmitted optical signal into an electrical signal; a first band pass filter (BPF) for passing only a spectrum range which corresponds to a component of the transmitted signal;

and a decoder for transforming the modulation format passed the first BPF into original data.

In the second aspect of the present invention, a wavelength-locked RSOA by injecting the low noise BLS or a wavelength-locked F-P LD having a multiple-contact by injecting the low noise BLS may be used instead of a wavelength-locked F-P LD by injecting the low noise BLS as a light source for the transmitter (Tx).

In a WDM-PON according to the present invention, a transmitter (Tx) being used at OLT or ONT is comprised of a low noise light source at a specific spectrum range and data to be transmitted are transformed into a modulation format having high spectral efficiency and then are transmitted.

In addition, a transmitter (Tx) according to the present invention may use a band pass filter (BPF) in order not to use a range except a low noise region.

Further, an optical receiver (Rx) according to the present invention receives data transmitted from a transmitter (Tx), passes only a spectrum range where a transmitted signal component exists so as to minimize a noise influence of a light source of the optical transmitter (Tx) where the noise is considered as any received signal deviating from a transmitted signal band scope, and the transmitted original signals are recovered by a signal-processing.

Moreover, a WDM-PON according to the present invention may be applicable to a general optical communications system.

Further features and advantages of the present invention can be obviously understood with reference to the accompanying drawings where same or similar reference numerals indicate same components.

Advantageous Effects

In a WDM-PON according to the present invention, it is possible to accomplish high-bandwidth transmission of 1 Gb/s or more by using a light source having a low noise characteristic and a modulation format with high spectral efficiency.

In addition, it is possible to embody a cost-effective access network because it is possible to upgrade an access network by increasing a data rate in a step-by-step manner in a WDM-PON according to the present invention.

BRIEF DESCRIPTION OF THE DRAWINGS

FIG. 1 illustrates a view of a structure of WDM-PON using a modulation format having high spectral efficiency, in accordance with the present invention.

FIG. 2 illustrates a view of a RIN spectrum of an F-P LD having a multiple-contact which is filtered by an AWG in accordance with one embodiment of the present invention.

FIG. 3 illustrates a view of a structure of WDM-PON using a wavelength-locked F-P LD by injection of a low-noise BLS, in accordance with the present invention.

FIG. 4 illustrates a view of an optical spectrum of a BLS having a low-noise characteristic in accordance with one embodiment of the present invention.

FIG. 5 illustrates a view of RINs measured from one mode of a BLS having a low-noise characteristic, an EDFA-based ASE, and an AR-coated F-P LD, respectively, in accordance with one embodiment of the present invention.

FIG. 6 illustrates a view of a noise degradation characteristic measured before and after being filtered by an AWG of a wavelength-locked F-P LD in accordance with one embodiment of the present invention.

FIG. 7 illustrates a view of SNR calculated from the RIN of −124 dB/Hz, which is required for transmission of 1.25 Gb/s, in accordance with one embodiment of the present invention.

FIG. 8 illustrates a view of SNR calculated from the RIN of −124 dB/Hz, which is required for transmission of 40 Mb/s, in accordance with one embodiment of the present invention.

MODE FOR THE INVENTION

Hereinafter, structures and functions of preferred embodiments in accordance with the present invention are described in more detail with reference to the appended drawings.

FIG. 1 illustrates a view of a structure of WDM-PON using a modulation format having high spectral efficiency, in accordance with the present invention.

Referring to FIG. 1, the present invention comprises a first AWG being positioned at an optical line termination (OLT) and having n-numbered output ports; a single mode fiber (SMF) being used for transmission of signals transmitted through the first AWG; a second AWG being positioned at a remote node (RN) and having n-numbered output ports; and a plurality of optical transceivers (TRx), each of which is connected to the second AWG and has a wavelength division multiplexing (WDM) filter. Another SMF for separate transmission is connected between RN where the second AWG is positioned and a plurality of subscribers (ONT1 to ONTn) located at an optical network termination (ONT). As illustrated in FIG. 1, OLT includes the first AWG and a plurality of optical transceivers (TRx) being connected to the first AWG. Each of the optical transceivers (TRx) at OLT side and at ONT side is comprised of a WDM filter into which an optical signal, split through the first AWG and the second AWG, is inputted; and a combination of an optical transmitter (Tx) and an optical receiver (Rx) which is connected to the WDM filter and transmits and receives optical signals having different wavelength bands. Further, a light source of an optical transmitter (Tx) is comprised of a low noise light source having a low noise at a specific frequency range. Data (Non-Return to Zero: NRZ) required to be transmitted can be transformed by an encoder into a modulation format having high spectral efficiency (e.g., quadrature amplitude modulation: QAM). After that, the transformed transmission data are modulated through a driver for modulating a low noise light source with a low noise at the specific frequency range and then is transmitted. Here, an optical transmitter (Tx) may further include a band-pass filter (BPF) between the driver and the encoder in order to restrict a spectrum band of a data modulation format.

In the meanwhile, an optical receiver (Rx) receives an optical signal through a photo diode (PD). Only a spectrum range where a transmitted signal component in a received signal exists may pass through BPF. Accordingly, any received signal deviating from a transmitted signal band is considered as noise and is filtered by BPF so that a noise influence of a light source in the original optical transmitter (Tx) which transmitted an optical signal is minimized. The signal component passed BPF of an optical receiver (Rx) is signal-processed by a decoder and a clock and data recovery (CDR) circuit and then originally transmitted signals (NRZ) are recovered. Any skilled person in the art may fully understand that a structure and a principle of WDM-PON illustrated in FIG. 1 may be applicable to a general optical telecommunications system.

In WDM-PON illustrated in FIG. 1 as described above, an operation method having a low RIN by varying driving current of an F-P LD may be used as an embodiment to embody a low noise light source having a low noise at the specific frequency range described above as a light source of ONT or ONT. In this case, two AWGs being used in WDM-PON must have a bandwidth, respectively, wider than one mode spacing of the F-P LD in order for two or more modes among multiple modes of the F-P LD to be filtered. Further, an F-P LD having a multiple-contact which is easy to control a wavelength may be used instead of an F-P LD, in order to use a low noise light source having a low noise at the specific frequency range as a light source of WDM-PON. In case of using an F-P LD having a multiple-contact, it is possible to control an F-P LD to oscillate always at a determined wavelength by compensating a variation in a lasing wavelength depending on a temperature change with an adjustment of injection current so that an F-P LD having a multiple-contact may be used as a light source of WDM-PON, which is illustrated in FIG. 2.

FIG. 2 illustrates a view of a RIN spectrum of an F-P LD having a multiple-contact which is filtered by an AWG in accordance with one embodiment of the present invention. It is possible to embody WDM-PON using a modulation format having high spectral efficiency, similarly to the method described above, when using a low noise range of 1.5 GHz over the RIN spectrum illustrated in FIG. 2.

FIG. 3 illustrates a view of a structure of WDM-PON using a wavelength-locked F-P LD by injection of a low-noise BLS, which is another embodiment embodying a light source having a low noise characteristic as a light source of ONT or OLT in WDM-PON in accordance with the present invention.

Referring to FIG. 3, a wavelength-locked F-P LD by a low noise injection is illustrated as one method of embodying a light source having a low noise characteristic which is used as a light source of ONT or OLT. Herein, although an embodiment of a light source of ONT having a low noise characteristic which will be described in detail below, an skilled person in the art may fully understand that these descriptions may be similarly applicable to a light source of OLT. A low noise BLS illustrated in FIG. 3 is embodied by using a principle of mutual injection between two F-P LDs, each having an antireflection (AR) coated front-facet. In this case, the low noise BLS is a light source with a multiple mode shape and thus has an optical spectrum as illustrated in FIG. 4, where 3 dB bandwidth for each mode of the low noise BLS is approximately 0.2 nm. Further, the RIN of each mode of the low noise BLS has a low noise characteristic of −135 dB/Hz which is significantly reduced compared with a mode partition noise of one mode of an AR coated F-P LD, except a 1/f noise component at a low frequency range, as illustrated in FIG. 5.

Referring back to FIG. 3, a low noise BLS of OLT is embodied by a principle of mutual injection and is used as an injection light source of a wavelength-locked F-P LD for transmission of up-stream signals and down-stream signals. Transmission of up-stream signals and transmission of down-stream signals are substantially the same and thus the transmission of up-stream signals will be described below. A low noise BLS of OLT passes through a second circulator, a second WDM filter (WDM2) and a SMF, and then is filtered and split through a second AWG for filtering a low noise BLS modes into a n-group (where n is a number of output ports of the second AWG or a channel number of WDM signals) at RN. The split signals by the second AWG are inputted into ONTs (ONT1 to ONTn), respectively, through SMF for separate transmission. Each inputted signal passes through a WDM filter in each ONT and is injected into an F-P LD of a transmitter (Tx) of a transceiver (TRx) and therefore the F-P LD is wavelength-locked. In this case, the wavelength-locked F-P LD also maintains a low noise characteristic due to a low noise characteristic of a low noise BLS which is a light source for injection.

In the meanwhile, FIG. 3 separately illustrates a structure of a transceiver (TRx) of ONT and OLT. The transceiver (TRx) illustrated in FIG. 3 is comprised of a transmitter (Tx) and a receiver (Rx). Data signals for transmitting and receiving having different wavelength bands, which are outputted from a transmitter (Tx) or which are inputted into a receiver (Rx), are separated by a WDM filter of a transceiver (TRx) and are transmitted either to an F-P LD of a transmitter (Tx) or to a PD of a receiver (Rx). Optical signal data (NRZ) being inputted into a transmitter (Tx) of ONT are transformed by an encoder into a modulation format having high spectral efficiency (e.g., quadrature amplitude modulation: QAM). After that, the transformed transmission data are modulated through a driver for modulating a low noise light source with a low noise at the specific frequency range and then is transmitted. Here, an optical transmitter (Tx) may further include a band-pass filter (BPF) between the driver and the encoder in order to restrict a spectrum band of a data modulation format. The optical signal data passed BPF are transmitted by a driver with being carried with a spectrum range having a low noise characteristic of an F-P LD. Further, FIG. 3 illustrates that an F-P LD is used as a light source of a transmitter (Tx) according to the present invention, which is illustrative and is not intended to limit the scope of the present invention. For example, a RSOA or an F-P LD having a multiple-contact may be used as a light source for a transmitter (Tx) according to the present invention. The transmitted data passes through SMF for separate transmission, the second AWG of RN and SMF, and then passes through the second WDM (WDM2), the second circulator and the first WDM (WDM1). After that, the transmitted data passed the first WDM (WDM1) further passes through the first AWG for de-multiplexing the transmitted data into n-numbered groups and are transmitted to a receiver (Rx) of a transceiver (TRx) which is a receiving end of OLT. In this case, each bandwidth per channel of the first AWG and the second AWG must have a wider than a bandwidth of one mode of the BLS being injected. An optical receiver (Rx) of OLT includes PD for transforming the transmitted optical signal into an electrical signal, BPF for passing only a spectrum range which corresponds to a transmitted signal component in order to minimize a noise influence of noise of a wavelength-locked F-P LD which is a light source for a transmitter (Tx) of OLT, wherein the noise is any received signal deviated from a transmitted signal band scope, and a decoder for transforming a modulation format having high spectral efficiency into original data. In case of digital data, the Receiver (Rx) of OLT may further include a CDR circuit for generating synchronized clock signal and for recovering the digital data. Digital data which have passed through the decoder and the CDR circuit are recovered into originally transmitted signals (NRZ).

Requirements for a relative signal-to-noise ration (SNR) required depending on modulation formats, respectively, when transmitting digital data with a high-bandwidth (1.25 Gb/s) by using the modulation formats having high spectral efficiency, while satisfying a requirement of a bit error rate (BER) of $10^{-12}$ is shown as table 1 below.

TABLE 1

SNR required depending on digital data formats

| Format | $E_b/N_o$ (dB) | R/W (bps/Hz) | SNR (dB) | W (MHz) | W (MHz) |
|---|---|---|---|---|---|
| OOK | 17 | 1 | 17 | 1250 | 40 |
| BPSK | 14 | 1 | 14 | 1250 | 40 |

TABLE 1-continued

SNR required depending on digital data formats

| Format | $E_b/N_o$ (dB) | R/W (bps/Hz) | SNR (dB) | W (MHz) | W (MHz) |
|---|---|---|---|---|---|
| QPSK | 14 | 2 | 17 | 625 | 20 |
| 16-QAM | 18 | 4 | 24 | 313 | 10 |
| 64-QAM | 22.4 | 6 | 30.2 | 209 | 7 |
| 256-QAM | 27 | 8 | 36 | 157 | 5 |

The data formats in Table 1 above are exemplified as an On Off Keying (OOK) modulation method, a Binary Phase Shift Keying (BPSK) modulation method, a Quadrature Phase Shift Keying (QPSK) modulation method, a 16-Quadrature Amplitude Modulation (16-QAM) method, a 64-QAM method, and a 256-QAM method. Table 1 also illustrates $E_b/N_o$ (signal per bit/noise per Hz and corresponds to SNR* (W/R)), transmission bit number per unit bandwidth (R(transmission bandwidth)/W(bandwidth)), SNR, and two kinds of bandwidths (W), respectively.

As can be seen from Table 1 above, high-bandwidth transmission becomes possible through the increase of spectral efficiency because the signal bandwidth necessary for meeting a requirement of obtaining a same transmission bandwidth is decreased, although the required SNR is rapidly increased as R/W becomes higher. In order to analyze and confirm a possibility of high-bandwidth transmission in case of using a wavelength-locked F-P LD by injection of a low noise BLS and using a transmitter (Tx) employing a modulation format having high spectral efficiency, the RIN over a range having a low noise part (a range except 1/f noise) is measured and marked as white circles and black circles in FIG. 6.

More specifically, FIG. 6 illustrates a view of a noise degradation characteristic measured before and after being filtered by an AWG of a wavelength-locked F-P LD in accordance with one embodiment of the present invention.

Referring to FIG. 6, FIG. 6 illustrates measured values regarding RIN (white circles) for a total mode of a wavelength-locked F-P LD after injecting a low noise BLS filtered by the second AWG (AWG2) illustrated in FIG. 2 into the F-P LD which is a light source for a transmitter (Tx) of ONT, and RIN (black circles) of a signal arrived at PD of OLT which is a receiving end after passing through the first AWG (AWG1) and the second AWG (AWG2). As can be seen from FIG. 6, the maximum measured value among RIN (black circles) arrived at PD turns out to be −124 dB/Hz. Thus, when using a wavelength-locked F-P LD which is a light source having a low noise characteristic by injection of a low noise BLS, RIN of the wavelength-locked F-P LD has a value significantly lower than −107 dB/Hz which is an approximate RIN value required for data transmission of 1.25 Gb/s so that high-bandwidth transmission becomes possible.

FIG. 7 illustrates a view of SNR calculated from the RIN of −124 dB/Hz, which is required for transmission with 1.25 Gb/s, in accordance with one embodiment of the present invention. In FIG. 7, respective straight lines indicate minimum SNR standard values required for 16-QAM, 64-QAM and 256-QAM, while respective curves indicate SNR values depending on modulation index for 16-QAM, 64-QAM and 256-QAM.

Referring to FIG. 7, when applying 256-QAM format among modulation formats having high spectral efficiency to a wavelength-locked F-P LD which is a light source having a low noise characteristic by injecting a low noise BLS as illustrated in FIG. 6, the SNR value in 157 MHz bandwidth is 39 dB which is higher than the minimum SNR standard value of 36 dB required for the same bandwidth of 157 MHz, assuming modulation index is 1, so that the SNR value satisfies a transmission requirement of 1.25 GHz. Accordingly, it is recognized that a wavelength-locked F-P LD is capable of transmitting data at a high-bandwidth of 1.25 GHz within a bandwidth of 157 Hz with 256-QAM modulation format, while maintaining wavelength independence regardless of a temperature change.

Referring back to Table 1 and FIG. 7, it is possible to transmit data of 1.25 GHz within a bandwidth of 313 MHz or 209 MHz with 16-QAM or 64-QAM which is another modulation format having high spectral efficiency. In case of 64-QAM and 16-QAM, although the measured values therefore may be possible to transmit through up to two channels and four channels, respectively (i.e., it is possible to transmit through a plurality of channels within a range where the sum of modulation indexes is equal to or less than 1), a frequency spectrum over a range having a low noise part (except 1/f noise) at an RIN spectrum of a wavelength-locked F-P LD by injection of a low noise BLS must be guaranteed to have values corresponding to bandwidths (209 MHz and 310 MHz) required for transmission of respective QAM signals. On the contrary, the maximum value of RIN (black rectangles) in FIG. 6, which is measured after passing through the first AWG (AWG1) and the second AWG (AWG2), turns out to be −99 dB/Hz for a wavelength-locked F-P LD by injection of an ASE-based BLS. This maximum value is higher than −107 dB which is an approximate RIN value required for high-bandwidth data transmission of 1.25 Gb/s so that high-bandwidth data transmission of 1.25 Gb/s becomes impossible even with a modulation format of BPSK which requires the lowest SNR.

FIG. 8 illustrates a view of SNR calculated from the RIN of −124 dB/Hz, which is required for transmission with 40 Mb/s, in accordance with one embodiment of the present invention.

Referring to FIG. 8 and Table 1, assuming that data are transmitted at a data rate of 40 Mb/s with 16-QAM modulation format by using a light source with RIN of −124 dB/Hz, the frequency bandwidth is 10 MHz (See Table 1), and the required minimum SNR value is 24 dB (See FIG. 8). In this case, it is possible to enhance a transmission bandwidth up to a maximum of 20 channels (i.e., up to a transmission bandwidth of 800 Mb/s) within a frequency bandwidth of 200 MHz, when increasing the number of transmission channels by an integer multiple for upgrading a data rate assigned to each subscriber (See FIG. 8). Further, in case of 256-QAM, it is possible to enhance a transmission bandwidth up to a maximum of 6 channels (i.e., up to a transmission bandwidth of 240 Mb/s) within a frequency bandwidth of 30 MHz. Accordingly, it is possible to upgrade a transmission bandwidth in a step-by-step manner in a WDM-PON using a modulation format having high spectral efficiency.

The description above is applied to an up-stream case where data are transmitted from ONT side to OLT side. However, any skilled person in the art may fully understand that the description regarding an up-stream case ca be similarly applicable to a down-stream case where data are transmitted from OLT side to ONT side.

INDUSTRIAL APPLICABILITY

In a WDM-PON according to the present invention, it is possible to accomplish high-bandwidth transmission of 1

Gb/s or more by using a light source having a low noise characteristic and a modulation format with high spectral efficiency.

In addition, it is possible to embody a cost-effective access network because it is possible to upgrade the access network by increasing a data rate in a step-by-step manner in a WDM-PON according to the present invention.

As various modifications could be made in the constructions and method herein described and illustrated without departing from the scope of the present invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A wavelength-division multiplexing passive optical network capable of high-bandwidth transmission for optical signals comprising:
   a low noise broadband light source (BLS) which is oscillating in a plurality of oscillating modes;
   a first circulator and a second circulator respectively being connected to the low noise BLS;
   a first arrayed waveguide grating (AWG) being positioned at an optical line termination (OLT) and having n-numbered output ports;
   n-numbered optical transceivers (TRx) (OLT1 to OLTn) respectively connected to the first AWG;
   a second AWG being positioned at a remote node (RN) and having n-numbered output ports;
   a single mode fiber (SMF) being used for transmission of signals transmitted through the first AWG and the second AWG;
   a first wavelength division multiplexing (WDM) filter being connected to the first circulator, the second circulator, and the first AWG, respectively;
   a second WDM filter being connected to the first circulator, the second circulator, and the SMF, respectively;
   n-numbered optical transceivers (TRx) (ONT1 to ONTn) being positioned at subscribers (ONT) and respectively connected to the second AWG; and
   n-numbered SMFs for separate transmission being connected between the second AWG and the n-numbered optical transceivers (TRx) (ONT1 to ONTn),
   wherein each of the numbered optical transceivers (TRx) (ONT1 to OLTn) at the OLT and each of the n-numbered optical transceivers (TRx) (ONT1 to ONTn) at the subscribers (ONT) comprises:
   a WDM filter into which an optical signal, split through the first AWG and the second AWG, is inputted;
   an optical transmitter (Tx) being connected to the WDM filter and for transmitting optical signals having different wavelength bands; and
   an optical receiver (Rx) being connected to the WDM filter and for receiving the optical signals having different wavelength bands,
   wherein the optical transmitter (Tx) comprises:
   a wavelength-locked F-P LD by injecting the low noise BLS;
   a driver for modulating the wavelength-locked F-P LD; and
   an encoder being connected to the driver and for transforming data to be transmitted into a modulation format having high spectral efficiency, and wherein the optical receiver (Rx) comprises:
   a photo diode (PD) for transforming a transmitted optical signal into an electrical signal:
   a first band pass filter (BPF) for passing only a spectrum range which corresponds to a component of the transmitted signal; and
   a decoder for transforming the modulation format passed the first BPF into original data.

2. The wavelength-division multiplexing passive optical network of claim 1, wherein the F-P LD is embodied by an F-P LD having a multiple-contact or a reflective semiconductor optical amplifier (RSOA).

3. The wavelength-division multiplexing passive optical network of claim 1 or 2, wherein the optical transmitter (Tx) further comprises a second BPF for restricting between the driver and the encoder in order to restrict a spectrum band of the modulation format.

4. The wavelength-division multiplexing passive optical network of claim 1 or 2, wherein, in case that the data to be transmitted are digital data, the optical receiver (Rx) further comprises a clock and data recovery (CDR) circuit being connected to the decoder and for generating synchronized clock signal and for recovering the digital data.

5. The wavelength-division multiplexing passive optical network of claim 3, wherein, in case that the data to be transmitted are digital data, the optical receiver (Rx) further comprises a clock and data recovery (CDR) circuit being connected to the decoder and for generating synchronized clock signal and for recovering the digital data.

6. The wavelength-division multiplexing passive optical network of claim 1 or 2, wherein the optical transmitter (Tx) and the optical receiver (Rx) can be used respectively in a case that a data rate is upgraded in a step-by-step manner by increasing the number of transmission channels by an integer multiple.

7. The wavelength-division multiplexing passive optical network of claim 3, wherein the optical transmitter (Tx) and the optical receiver (Rx) can be used respectively in a case that a data rate is upgraded in a step-by-step manner by increasing the number of transmission channels by an integer multiple.

8. The wavelength-division multiplexing passive optical network of claim 1 or 2, wherein a mode spacing of the F-P LD is narrower than the bandwidth of the first AWG and the second AWG and the first AWG and the second AWG can filter two or more modes among multiple modes of the F-P LD.

9. The wavelength-division multiplexing passive optical network of claim 3, wherein a mode spacing of the F-P LD is narrower than the bandwidth of the first AWG and the second AWG and the first AWG and the second AWG can filter two or more modes among multiple modes of the F-P LD.

10. The wavelength-division multiplexing passive optical network of claim 1 or 2, wherein the first AWG and the second AWG respectively have a bandwidth wider than a bandwidth of the low noise BLS.

11. The wavelength-division multiplexing passive optical network of claim 3, wherein the first AWG and the second AWG respectively have a bandwidth wider than a bandwidth of the low noise BLS.

12. The wavelength-division multiplexing passive optical network of claim 1 or 2, wherein the modulation format having high spectral efficiency is any one of a Binary Phase Shift Keying (BPSK) modulation method, a Quadrature Phase Shift Keying (QPSK) modulation method, and a Quadrature Amplitude Modulation (QAM) method.

13. The wavelength-division multiplexing passive optical network of claim 3, wherein the modulation format having high spectral efficiency is any one of a Binary Phase Shift Keying (BPSK) modulation method, a Quadrature Phase Shift Keying (QPSK) modulation method, and a Quadrature Amplitude Modulation (QAM) method.

* * * * *